(12) United States Patent
Donaker et al.

(10) Patent No.: US 11,461,336 B2
(45) Date of Patent: *Oct. 4, 2022

(54) SELECTING BETWEEN GLOBAL AND LOCATION-SPECIFIC SEARCH RESULTS

(71) Applicant: GOOGLE LLC, Mountain View, CA (US)

(72) Inventors: Gregory John Donaker, Brooklyn, NY (US); David Blackman, Rego Park, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,449

(22) Filed: Jul. 31, 2018

(65) Prior Publication Data

US 2018/0336249 A1    Nov. 22, 2018

Related U.S. Application Data

(63) Continuation of application No. 12/964,158, filed on Dec. 9, 2010, now Pat. No. 10,037,357.

(60) Provisional application No. 61/374,372, filed on Aug. 17, 2010.

(51) Int. Cl.
  *G06F 16/2457* (2019.01)
  *G06F 16/9537* (2019.01)

(52) U.S. Cl.
  CPC ...... *G06F 16/2457* (2019.01); *G06F 16/9537* (2019.01)

(58) Field of Classification Search
  CPC ......... G06F 16/24573; G06F 16/24575; G06F 16/2578; G06F 16/9537; G06F 16/2457
  USPC .......................................................... 707/748
  See application file for complete search history.

(56) References Cited

U.S. PATENT DOCUMENTS

| | | | |
|---|---|---|---|
| 4,845,658 | A | 7/1989 | Gifford |
| 5,675,819 | A | 10/1997 | Schuetze |
| 6,643,640 | B1 | 11/2003 | Getchius et al. |
| 7,483,881 | B2 | 1/2009 | Egnor et al. |

(Continued)

OTHER PUBLICATIONS

Eli Lassman Mar. 16, 2010, youtube.com, https://www.youtube.com/watch?v=c-KUyjezhQI.*

(Continued)

*Primary Examiner* — Phuong Thao Cao
(74) *Attorney, Agent, or Firm* — Marshall, Gerstein & Borun LLP (57) ABSTRACT

Methods, system, and apparatus, including computer programs encoded on computer storage media, for selecting between location-specific and global search results. One method includes receiving a query and a location identifier identifying a geographic location, obtaining a location-specific set of search results responsive to the query and a global set of search results responsive to the query, and determining a cluster score for the global set of search results. The method further includes selecting either the global set of search results or the location-specific set of search results as a primary set of search results according to one or more scores for the location-specific and global sets of search results, wherein the one or more scores include the cluster score, and identifying one or more identified search results in the primary set of search results for presentation in response to the query.

17 Claims, 4 Drawing Sheets

(56) References Cited

U.S. PATENT DOCUMENTS

| | | | |
|---|---|---|---|
| 7,761,350 B1* | 7/2010 | Ridgeway | H04W 4/024 |
| | | | 705/30 |
| 7,801,899 B1 | 9/2010 | Spitkovsky | |
| 7,822,751 B2 | 10/2010 | O'Clair et al. | |
| 7,908,280 B2 | 3/2011 | Frank et al. | |
| 7,966,321 B2* | 6/2011 | Wolosin | G06F 16/9537 |
| | | | 707/765 |
| 8,341,143 B1* | 12/2012 | Karls | G06F 16/9038 |
| | | | 707/708 |
| 8,359,300 B1 | 1/2013 | Shin | |
| 8,433,512 B1 | 4/2013 | Lopatenko et al. | |
| 8,463,772 B1* | 6/2013 | Aminzade | G06F 16/9537 |
| | | | 707/723 |
| 8,538,973 B1* | 9/2013 | Gonzalez | G06F 16/9537 |
| | | | 707/758 |
| 9,098,589 B1 | 8/2015 | Mishra et al. | |
| 10,037,357 B1 | 7/2018 | Donaker et al. | |
| 2005/0065959 A1 | 3/2005 | Smith et al. | |
| 2005/0177303 A1* | 8/2005 | Han | G01C 21/3682 |
| | | | 701/400 |
| 2006/0149734 A1 | 7/2006 | Egnor et al. | |
| 2006/0271531 A1 | 11/2006 | O'Clair et al. | |
| 2006/0287810 A1 | 12/2006 | Sadri et al. | |
| 2007/0282811 A1 | 12/2007 | Musgrove | |
| 2008/0168052 A1 | 7/2008 | Ott et al. | |
| 2008/0172374 A1 | 7/2008 | Wolosin et al. | |
| 2008/0228754 A1 | 9/2008 | Frank et al. | |
| 2009/0019028 A1 | 1/2009 | Norris et al. | |
| 2009/0088967 A1 | 4/2009 | Lerner et al. | |
| 2009/0132511 A1 | 5/2009 | Yang et al. | |
| 2010/0036807 A1* | 2/2010 | Lieske, Jr. | G06F 16/29 |
| | | | 707/E17.014 |
| 2010/0083157 A1* | 4/2010 | Follmann | G01C 21/36 |
| | | | 715/771 |
| 2010/0171763 A1* | 7/2010 | Bhatt | G06F 16/9537 |
| | | | 345/660 |
| 2010/0318528 A1 | 12/2010 | Kupershmidt | |
| 2011/0073999 A1 | 3/2011 | Niu et al. | |
| 2011/0137880 A1 | 6/2011 | Blais | |
| 2011/0235858 A1* | 9/2011 | Hanson | G06K 9/6218 |
| | | | 382/103 |
| 2014/0358971 A1* | 12/2014 | Aminzade | G06F 16/3322 |
| | | | 707/780 |

OTHER PUBLICATIONS

Kang, Excerpted HTML Code of "1000 is the new 10" Feb. 17, 2009, googleblog.com, https://maps.googleblog.com/2009/02/1000-is-new-10.html.*

Kang, 1000 is the new 10 Feb. 17, 2009, googleblog.com, https://maps.googleblog.com/2009/02/1000-is-new-10.html.

* cited by examiner

SELECTING BETWEEN GLOBAL AND LOCATION-SPECIFIC SEARCH RESULTS

CROSS-REFERENCE TO RELATED APPLICATIONS

This application is a continuation of U.S. patent application Ser. No. 12/964,158, filed Dec. 9, 2010, issued as U.S. Pat. No. 10,037,357; which claims the benefit of U.S. Provisional Application 61/374,372 filed on Aug. 17, 2010; the disclosures of which are incorporated herein by reference in its entirety for all purposes.

BACKGROUND

This specification relates to presenting search results in response to user queries. Search results are provided by Internet search engines in response to a user's search query. Some search engines tailor search results to locations derived from the text of a user's query. For example, if a user searches for "pizza new york," a search engine could look for search results for "pizza" in the location "new york" or "pizza new" in the location "york." Some search engines tailor the search results to an inferred location of interest to the user, rather than a location derived from the query. Example inferred locations of interest are the current location of a user (e.g., estimated from the user's Internet Protocol (IP) address) or the location represented by a map displayed to a user at the time he or she enters a search query.

However, users are not always looking for search results tailored to their inferred locations. Sometimes, users are interested in search results relevant to an entirely different location.

SUMMARY

A search engine selects between location-specific sets of search results specific to inferred locations of interest to a user and a global set of search results that are not specific to any inferred location of interest. The search engine generates at least one location-specific set of search results and a global set of search results, generates one or more scores measuring the quality, responsiveness, or geographic qualities of each set, and selects between the global set and the location-specific set according to the scores.

In general, one innovative aspect of the subject matter described in this specification can be embodied in methods that include the actions of receiving a query and a location identifier identifying a geographic location; obtaining a location-specific set of search results responsive to the query and a global set of search results responsive to the query, wherein the location-specific set of search results is specific to the associated geographic location for the query and the global set of search results is not specific to the associated geographic location for the query; determining a cluster score for the global set of search results, wherein the cluster score is a measure of how geographically clustered entities associated with the global set of search results are; selecting either the global set of search results or the location-specific set of search results as a primary set of search results according to one or more scores for the location-specific and global sets of search results, wherein the one or more scores include the cluster score; and identifying one or more identified search results in the primary set of search results for presentation in response to the query. Other embodiments of this aspect include corresponding systems, apparatus, and computer programs recorded on computer storage devices, each configured to perform the operations of the methods.

These and other embodiments can each optionally include one or more of the following features. The associated geographic location is a geographic location determined to be of interest to a user based on information that does not include text of the query. The actions further include presenting the one or more identified search results. The actions further include selecting a secondary set of search results, and presenting a selectable user interface element that, when activated by a user, causes the system to present the secondary set of search results. The query is received from a user through a map-based search user interface, and presenting the primary set of search results comprises presenting the primary set of search results in the map-based user interface.

The one or more scores for the location-specific and global sets of search results further include one or more responsiveness scores that each estimate how responsive one of the sets of search results is to the query. The one or more scores for the location-specific and global sets of search results further include one or more quality scores that each estimate a quality of the search results in each results set. The one or more scores for the location-specific and global sets of search results further include one or more scores derived from an estimate of a physical distance between search results in one of the sets of search results and the associated geographic location for the query.

Selecting either the global set of search results or the location-specific set of search results as a primary set of search results comprises selecting the global set of search results if the clustering score for the global set of search results indicates that a pre-determined percentage of entities associated with search results in the global set of search results are physically located within a pre determined distance of each other. Selecting either the global set of search results or the location-specific set of search results further comprises only selecting the global set of search results if an aggregate distance between search results in the global set of search results and the inferred location is greater than a first threshold. Selecting either the global set of search results or the location-specific set of search results further comprises only selecting the global set of search results if at least one of the search results in the global set of search results has a name that matches the query. Selecting either the global set of search results or the location-specific set of search results further comprises only selecting the global set of search results if a top ranked result of the global set of search results is different from a top ranked result of the location-specific set of search results. Selecting either the global set of search results or the location-specific set of search results further comprises only selecting the global set of search results if the query does not match a category associated with search results in the global set of search results.

Particular embodiments of the subject matter described in this specification can be implemented so as to realize one or more of the following advantages. Users can be presented with relevant search results. Users who search for a well-known or unique entity that is located in one location can be shown search results for that entity, even if the inferred location of the user indicates that the user is interested in a different location.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
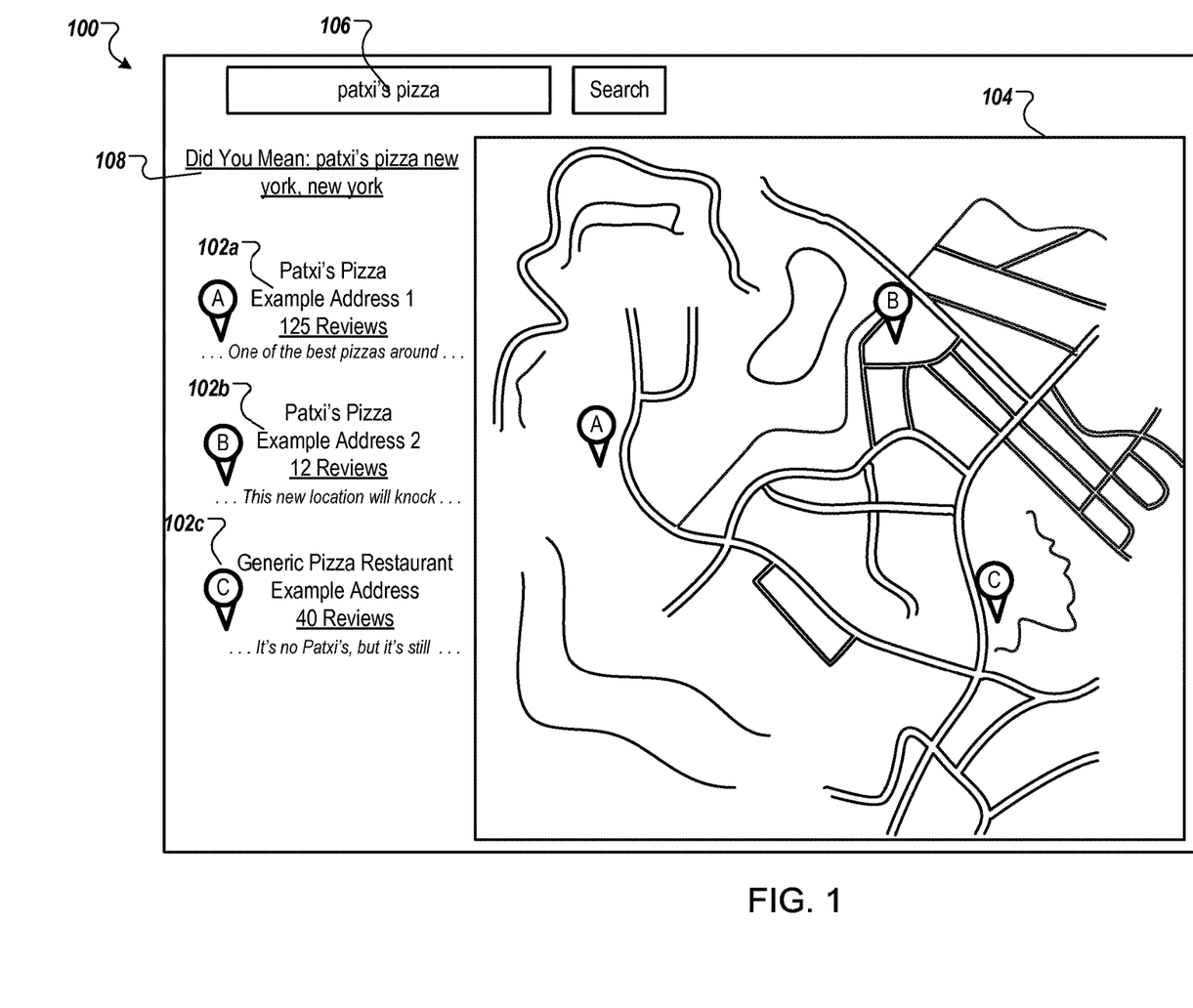
FIG. 1 illustrates an example user interface depicting search results on a map interface.

FIG. 1 illustrates an example user interface 100 depicting search results 102a, 102b, and 102c and their corresponding locations on a map 104. The search results 102a, 102b, and 102c were generated by a search engine, the operation of which will be described below, in response to the query "patxi's pizza," 106, entered by a user using a computer physically located in New York City while viewing a map of New York City. The map 104 presented in response to the search query depicts the San Francisco Bay area, and the search results 102a, 102b, and 102c are for businesses in the San Francisco Bay area.

Because of the user's physical location and because the user was viewing a map of New York City, the search engine determined that New York City is an inferred location of interest to the user. However, the locations of the search results 102a, 102b, and 102c are in the San Francisco Bay area and not in New York City. This is because "patxi's pizza" is a relatively unique name of a few pizza restaurants in the San Francisco Bay area. The search engine determined that even though the inferred location of interest was New York City, the best search results were in the San Francisco Bay area.

The user interface 100 also includes a hyperlink 108 with the text "Did You Mean: patxi's pizza new york, new york." If a user selects this hyperlink 108, e.g., with a mouse or other input device, search results for the New York City are will be displayed.

Figure 2:
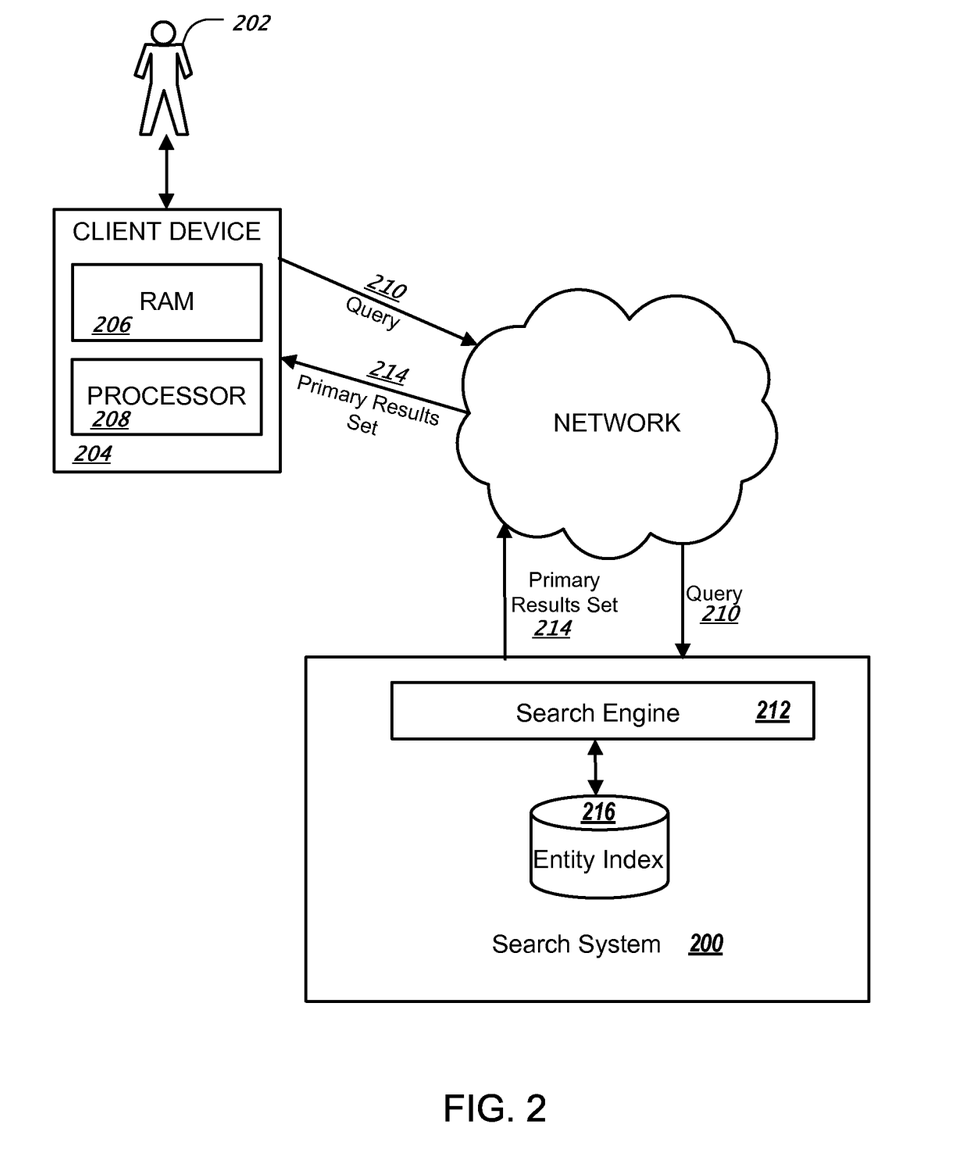
FIG. 2 is a block diagram of an example search system.

FIG. 2 is a block diagram of an example search system 200 that can be implemented in an internet, an intranet, or another client and server environment. The search system 200 is an example of an information retrieval system in which the systems, components, and techniques described below can be implemented. The search system 200 can be implemented as, for example, computer programs running on one or more computers in one or more locations that are coupled to each other through a network.

A user 202 interacts with the search system 200 through a client device 204. For example, the client device 204 can be a computer coupled to the search system 200 through a local area network (LAN) or wide area network (WAN), e.g., the Internet. In some implementations, the search system 200 and the client device 204 can be one machine. For example, a user can install a desktop search application on the client device 204. The client device 204 will generally include a random access memory (RAM) 206 and a processor 208.

The user 202 submits a query 210 to a search engine 212 that is a module of the search system 200. When the user 202 submits a query 210, the query 210 is transmitted through a network to the search engine 212.

When the query 210 is received by the search engine 212, the search engine 212 generates multiple sets of search results that are each responsive to the query. The search engine then selects one of the sets of search results as a primary results set 214, which is returned to the user 202 through the network. The search engine 212 generates and selects from one or more location-specific results sets that are specific to particular inferred locations of interest to the user ("inferred locations") and a global results set that is not specific to any particular location. A set of search results is specific to a particular location if the search results are filtered so that only search results within a predetermined distance of the location are included in the set. Thus, the search engine 212 either returns location-specific search results to the user, or returns more general global search results to the user. In some implementations, the search engine 212 only generates the global results set when there is no reference to a location, e.g., no city name, state name, zip code, etc. in the text of the query 210.

Each inferred location is a location determined to be of interest to the user based on something other than the text of the query 210 itself. For example, when the user 202 is submitting a search through a map interface, one example inferred location is the location shown on the map. As another example, an inferred location can be a location estimated from an Internet Protocol (IP) address associated with the user 202. As yet another example, an inferred location can be a physical location of the client device 204. The physical location of the client device 204 can be determined, for example, using Global Positioning System (GPS) data, cell phone tower triangulation, or other conventional location-determination methods. As a still further example, the inferred location can be a location determined from past searches performed by the user 202. For example, if the past five queries the user 202 has submitted to the search system 200 reference New York or things located in New York, an inferred location of interest to the user is New York. As yet another example, the inferred location can be a default location specified by the user. In some implementations, the size of the location is dependent on the technique used to infer the location. For example, if GPS data is used to infer the location, the size of the location can be the area in which the GPS data indicates the user is located. If the default location is specified by the user, then the size of the location is whatever is specified by the user. For example, if a user specifies California, the location would be the entire state of California. If the user specifies San Francisco, Calif., the location would be the city of San Francisco. If the user specifies a particular zip code within San Francisco, Calif., the location would be that zip code.

When the search engine 212 receives the query, the search engine 212 determines whether to search an entity index 216 to generate the sets of search results for each inferred location and to generate the global results set, or whether to perform a conventional document search. In some implementations, the system makes the determination according to whether the user specified that an entity search should be performed, for example, because the user indicated that a search should be done over map data. If the user does specify that an entity search should be performed, the system performs the entity search. In other implementations, the system makes the determination according to the type of user interface through which the user 202 submitted the search query 210. For example, if the user submits the query through a user interface, such as the maps user interface illustrated in FIG. 1, that indicates that entity data should be searched, the system determines to search the entity index 216. In some implementations, the system makes the determination according to features of the query. For example, if the query has previously submitted more than a pre-determined threshold number of times by users through a map user interface, the system can search the entity index 216 even if the query 210 is not submitted through a map user interface. In still other implementations, the search engine 212 always searches the entity index 216.

The entity index 216 includes records for individual entities. Each entity is a place or thing of interest. Example entities are businesses, landmarks, and events. For example, the restaurant Patxi's Pizza in Palo Alto, Calif. is an entity, the landmark the Statue of Liberty is an entity, and the event Bay to Breakers is an entity. Each search result in the search results set corresponds to one of the entities in the entity data.

The records for the entities can include various types of information. For example, the record for a given entity can include one or more of the following pieces of information: name, location, type, category, number of reviews, representative document, and number of documents referring to the entity. The location of an entity is a physical location associated with the entity. For example, if a business is located at 12345 Anywhere St., the address 12345 Anywhere St. would be its location. The type of an entity is, for example, whether it is a business, a landmark, or an event. The category of an entity is a label that has been assigned to the entity. For example, a restaurant that serves pizza could have the category "restaurant" or "pizzeria." The categories can be manually assigned or automatically derived from an analysis of information about the entity, e.g., using conventional methods such as classifiers trained using machine learning. The representative document for an entity is a web page (or other document) that is closely associated with the entity. For example, a restaurant homepage could be the representative document for the restaurant entity.

The entity index 216 is created, for example, by the search system 200. The search system crawls documents, for example, on the Internet, and identifies information relevant to individual entities. This information is aggregated on an entity-by-entity basis to generate the entity index 216.

Figure 3:
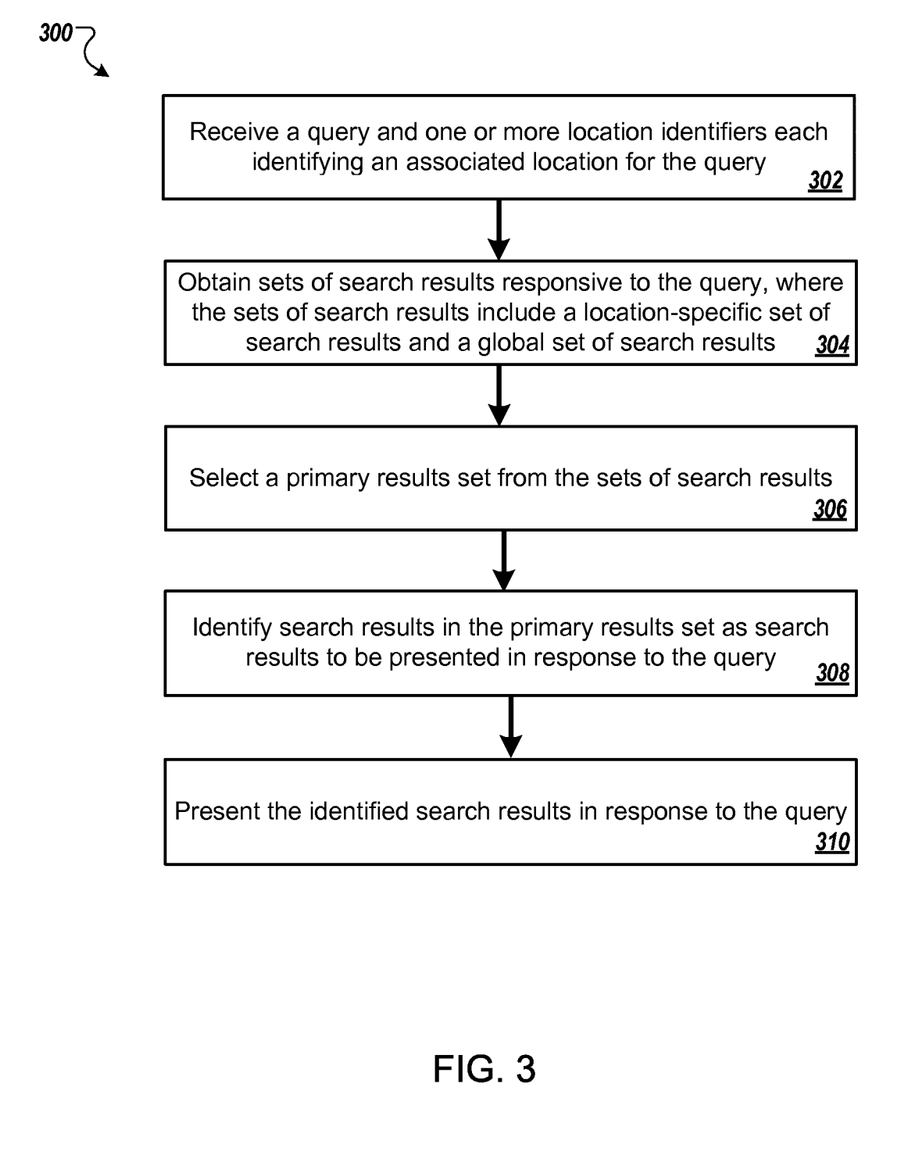
FIG. 3 is a flow chart of an example method for selecting and presenting a primary results set in response to a user query.

FIG. 3 is a flow chart of an example method 300 for selecting and presenting a primary results set in response to a user query. For convenience, the method 300 is described in reference to a system of one or more computers that performs the method. The system can be, for example, the search system 200 described above with reference to FIG. 2.

The system receives a query and one or more location identifiers (302). Each location identifier is a representation of a geographic location. For example, each location identifier can be latitude and longitude coordinates, a name of a city, county, or state, a zip code, or data referencing one of these. The one or more locations can be, for example, inferred locations derived from information other than the text of the query. In some implementations, the query is received from a user device, e.g., a personal computer running a web browser, and the one or more inferred locations are generated by the system in response to receiving the query.

The system obtains sets of search results responsive to the query (304). The sets of search results include at least one location-specific set of search results and a global set of search results.

In some implementations, the system obtains the sets of search results by searching a repository of information, e.g., the entity index 216 described above with reference to FIG. 2, to select and rank search results that are responsive to the query. The system ranks search results according to scores it assigns to the search results. The system can select and rank search results, for example, using conventional techniques. In some implementations, the search results in each set are filtered so that only search results having a score above a particular threshold are selected and ranked.

In some implementations, the system identifies the location-specific set of search results by performing a location-specific search that only identifies search results that are both responsive to the query and for entities within a predetermined distance of the location associated with the query. For example, the system can score each search result according to a function of distance from the location, and optionally other conventional factors, for example, responsiveness and quality. If the distance is greater than a threshold, the score goes to zero, indicating the search result should be omitted.

The system uses a different function that never reaches zero when scoring and selecting the global search results. In some implementations, this different scoring function does not take location into account. For example, the search results can be scored according to conventional quality and relevance factors, without regard to distance from a location.

In other implementations, this different scoring function is relative to a location. For example, if there is just one inferred location, the system can score the global search results according to their distance from the inferred location. If there are multiple inferred locations, the system can calculate scores for the search results for each inferred location, and then select the maximum score, or the average score, for each search result. Alternatively, if there are multiple inferred locations, the system can select the most-likely inferred location and calculate the score of the global search results according to their distance from the most-likely inferred location. For example, if a user had specified that his or her location was New York City, but the user's IP address is in Palo Alto, Calif., and his or her last query was for directions from the San Francisco Airport to University Avenue in Palo Alto, Calif., the system can determine that Palo Alto is the most-likely inferred location for the user. In other words, the system can select the location that appears the most frequently in the inferred locations for the user as the most-likely inferred location. Scoring the search results according to the relative distance from one or more of the inferred locations for the user causes the search results to be ranked, based in part, on their distance from a user. For example, if one user in Europe and one user in the United States both issue a search query for a restaurant chain having one location in Paris and one location in New York, the user in Europe would see the result in Paris, France ranked above the result in New York, N.Y., and the user in the United States would see the result in New York, N.Y. ranked above the result in Paris, France.

In alternative implementations, the system performs one search for search results satisfying the query, and then groups the search results into local results sets based on their relative distance from the inferred locations to generate the results sets. The system can also generate a global results set from the search results.

The system selects a primary results set from the sets of search results (306). An example method for selecting a primary results set is described below with reference to FIG. 4.

The system identifies search results in the primary results set as search results to be presented in response to the query (308). For example, the system can select a pre-determined number of top-scoring search results in the primary search results set, can select all search results in the primary search results set that have a score that satisfies a threshold, or can select all of the search results in the primary results set.

The system presents the identified search results in response to the query (310). In some implementations, the system presents the identified search results by transmitting the search results to a client device for presentation to a user. The search results can be presented as search results in a conventional search results page, or on a map interface, for example, the map interface illustrated in FIG. 1.

In some implementations, the system also selects one or more secondary results sets from the sets of search results, for example, as described below with reference to FIG. 4. The secondary results sets are results sets that are not determined to be as relevant to the user's query as the primary results set, but that are determined to have at least some relevance. The system presents a user selectable user interface element, e.g., a hyperlink or a button, corresponding to the selected secondary search results set or sets. In some implementations, the system presents a user selectable user interface element for each secondary results set. When a user activates the element for a particular secondary results set, e.g., by clicking on or otherwise selecting it, the system causes the particular secondary results sets to be presented to the user. For example, in some implementations, the system presents a hyperlink with the text, "Did you mean" followed by the query plus the location associated with the corresponding selected secondary search results in a particular set. When the user clicks on the hyperlink, the system presents the secondary search results. In other implementations, the system presents a single selectable user interface element for all of the one or more secondary results sets.

Figure 4:
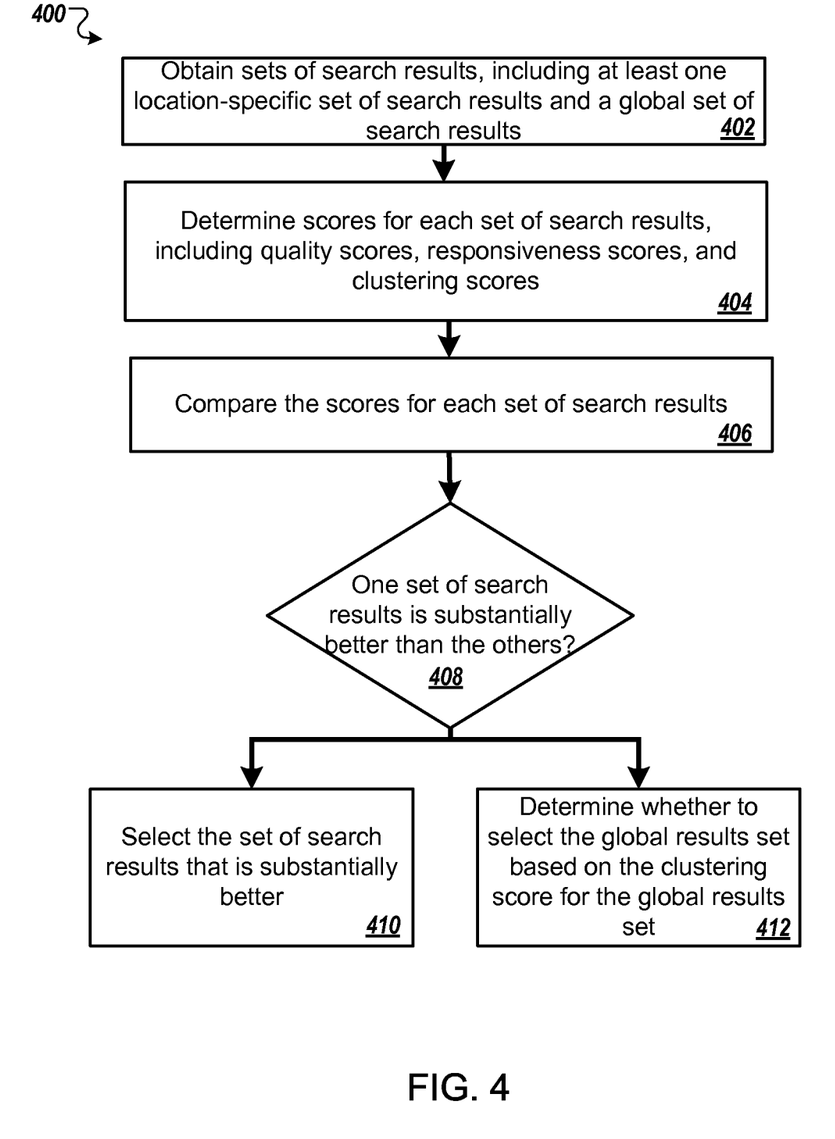
FIG. 4 is a flow chart of an example method for selecting a primary set of search results.

FIG. 4 is a flow chart of an example method 400 for selecting a primary set of search results. For convenience, the method 400 is described in reference to a system of one or more computers that performs the method. The system can be, for example, the search system 400 described above with reference to FIG. 2.

The system obtains sets of search results (402). The sets of search results include a location-specific set of search results and a global set of search results. The sets of search results are represented, for example, as sets of identifiers referring to records in a repository, e.g., the entity index 216. Each set of search results is responsive to a query. The sets of search results include a global set of search results and a location-specific set of search results. The sets of search results can be obtained, for example, as described above with reference to FIG. 3.

The system determines one or more scores for each set of search results (404). In some implementations, the scores for each set of search results include one or more quality scores that estimate a quality of the search results in each set in general, and one or more responsiveness scores that estimate how responsive the search results in each set are to the query. The system can also generate other scores, including, for example, a clustering score that estimates how geographically clustered entities associated with a set of search results are, and a distance score derived from the distance between the physical location of the entity for each search result in a given set and a location associated with the user. These scores can be generated for all of the sets of search results or for just the global sets of search results.

The system determines the one or more quality scores for each results set from individual scores estimating the quality of individual search results in the set. For example, the system can derive an individual quality score from the amount of information available for each result in the results set, for example, the number of reviews or documents associated with the result. The system can also receive a quality score along with each search result, e.g., from the search engine. The system aggregates the individual quality scores for the search results in the set, or for some pre-determined number of results in the set, e.g., the top ten ranked search results, to determine quality scores for the set of search results as a whole. For example the system can sum or average the individual quality scores for the search results.

The system determines the one or more responsiveness scores for each results set from individual responsiveness scores estimating how responsive the individual search results in each results set are to the query. For example, the system can derive a responsiveness score for a given search result from whether the query matches the name of the entity associated with the search result. For example, if the query is "patxi's" and the name of entity associated with a search result is "Patxi's Pizza," then the responsiveness score could have a value indicating that the query matches the name of the entity. As another example, the system can derive a responsiveness score for a given search result from whether words in reviews or other documents associated with the entity for the search result match the words in the query. This can be a binary score, or a score that indicates the number of matches. As yet another example, the system can derive a responsiveness score for a given search result from whether the words in the query match a category associated with the search result. For example, if the query is "pizzeria" and a search result is for a business categorized as being a "pizzeria," the score can have a value indicating that the query matches a category for the entity. As another example, the responsiveness score for a given search result can be a score for the search result received from the search engine that identified the search result. The system aggregates the individual scores of the search results in the set, or for some pre-determined number of results in the set, e.g., the top ten ranked search results, to determine responsiveness scores for the set of search results as a whole. For example the system can sum or average the individual scores.

The clustering score for a results set is a measure of how geographically clustered entities associated with the results set are. The system considers either all of the search results in the results set, or a number of top-scoring search results, for example, according to the scores used by a search engine to rank the search results. The system then derives the clustering score from the distribution of the physical locations of entities corresponding to the search results. For example, the clustering score could be the percentage of search results for entities physically located within a pre-determined radius of each other, or the radius needed to encompass a pre-determined percentage of the entities associated with the search results. Other conventional metrics of the degree of clustering of the locations can alternatively be used. In some implementations, the system derives a clustering score for the global set of search results and does not derive a clustering score for any of the location-specific sets of search results. In other implementations, the system derives a clustering score for all of the sets of search results.

The system derives the distance score from the distance between the physical location of the entity for each search result in a given set and a location associated with the user, for example, one or more of the inferred locations for the user. If there is just one inferred location, the system can use the distance between the physical entity for search results in a given set and the one inferred location. If there are multiple inferred locations, the system can derive a distance score for each inferred location, and then select the maximum score, or the average score, for each search result. Alternatively, if there are multiple inferred locations, the system can select the most likely inferred location, for example, as described above, and calculate the distance score for that inferred location. The system can use an aggregate of these individual distances, for example, a sum or an average, as a score for the results set as a whole. Alternatively, the system can use an aggregate of a subset of the individual distances, for example, a number of smallest distances, or the distances for a number of top-scoring search results, e.g., according to scores provided by the search engine.

In some implementations, rather than generating all of the scores described above, the system generates a subset of the scores. For example, the system could generate responsiveness and clustering scores, but not quality and distance scores, for the sets of search results.

The system compares the scores for each set of search results to determine whether one set of search results is substantially better than the other sets of search results (406). One set of search results is substantially better than the other sets of search results if it is the highest scoring set of search results according to an overall score derived from one or more of the scores described above, and there is at least a threshold drop-off between its overall score and the overall score of the next highest scoring set of search results. The threshold drop-off can be a pre-determined amount or a pre-determined percentage of the score of the top scoring search result. For example, the system can determine an overall score for each set of search results from the responsiveness scores for the sets of search results.

Other overall scores can also be used. For example, the system can use an overall score derived from whether the search results in each set are for entities having names that match the query and the percentage of search results in each set that fall within a predefined radius. Another example overall score can be derived from a distance between locations mentioned in documents associated with the entities in each of the results sets and an inferred location of the user. If many of the documents that are associated with the entity only mention locations that are far away from the inferred location of the user, then it is less likely that the result set is good. Other overall scores can be determined, for example, empirically.

If one set of search results is substantially better than the other sets of search results (408), the system selects that search result (410). Otherwise, the system determines whether to select the global results set based on the clustering score for the global results set (412). In general, if the clustering score indicates that the global set of search results are clustered around a single location, then the system will be more likely to select the global search results. Tightly clustered global search results indicate that a specific entity responsive to the query exists somewhere other than at any of the inferred locations.

In some implementations, the system uses the clustering score for the global set of search results along with other scores for the sets of search results to make the selection. For example, the system can select the global set of search results when the search results in the global set of results are far away from any of the inferred locations for the user, the search results in the global set of search results are clustered around a geographic location, and the search query matches the name of at least one entity corresponding to one of the search results in the global search result sets. For example, the system can require that the aggregate distance between (i) search results in the global set of search results and (ii) an inferred location of the user exceeds a threshold, that a pre-determined percentage of entities associated with the search results in the global search results set are physically located within a pre-determined radius of each other, and that at least one of the search results in the set have a name that matches the words of the query. If the system does not select the global set of search results the system can select, for example, the top-scoring set of location-specific search results according to one of the scoring methods described above.

Consider an example where the system is comparing two sets of search results for the query "gary danko," a restaurant in San Francisco, Calif. One set of search results is a location-specific set of search results corresponding to the query "gary danko" and the inferred location New York City. The search results in this location-specific set of search results are scattered across New York City and correspond to restaurants that have been compared to Gary Danko in user reviews and other websites. The other set of search results is a global set of search results corresponding to the query "gary danko" with no requirement that search results be located near a particular location. There is one search result in this set of search results: the search result for the Gary Danko restaurant. The system will determine that the distance between New York and San Francisco satisfies the threshold, the search results in the global set of search results are clustered around San Francisco, since there is only one search result in the set, and that the name of the restaurant "Gary Danko" matches the query text. The system will select the global set of search results as the primary set of search results in response to these determinations.

The system can additionally implement other conditions that have to be satisfied before the system selects the global search results. For example, the system can require that the first results in the set of global search results be non-categorical in nature. To make this determination, the system can use the score described above that indicates whether the words in the query match a category associated with one or more of the first search results in the set. If the score indicates that the words in the query match a category for one or more of the first search results, the set of search results can be determined to be categorical. In some implementations, a threshold number of search results, e.g., a number greater than a pre-determined number or a pre-determined percent of the search results, must be categorical for the results set to be classified as categorical.

As another example, the system can require that the query was not for a chain of businesses. The system can determine that the query is for a chain of businesses, for example, from a percentage of the top-ranked search results responsive to the query that are in the same domain. If the percentage exceeds a threshold, then the query is determined to be for a chain of businesses. For example, if nine of the top ten search results for the query "best buy" are from the domain "http://www.bestbuy.com," then the system can determine that Best Buy is likely a chain.

As yet another example, the system can compare the top ranked search result from each set, according to the ranking assigned to the search results by the search engine. If the top ranked search result from the global set of search results matches one of the top ranked location-specific search results, the system does not select the global set of search results, but instead selects the matching set of location-specific search results as the primary set of search results.

As yet another example, if the top ranked search result from the global set of search results is a location, e.g., a street, city, county, mountain, etc., rather than another type of entity, the system does not select the global results set, but instead selects one of the location-specific sets of search results.

Other methods for selecting between the results sets can also be used by the system. For example, in some implementations, the system combines the scores to generate an overall score for each set of search results, and then selects the set of search results with the best overall score as the primary search result. The scores used, and the way the scores are combined can be determined, for example, empirically. In general, the scores and the way of combining the scores are determined so that location-specific sets of search results that have the same responsiveness and quality as global search results will score better than the global search results. In other words, the global set of search results is used only if it is substantially better in some respects than all of the location-specific sets of search results.

In some implementations, the system also selects one or more secondary sets of search results. The system can select the one or more secondary sets of search results by performing the analysis described above for all of the remaining sets of search results, excluding the primary set of search results. In some implementations, the system lowers the thresholds for selecting sets of search results. For example, when selecting the secondary search results, the system can select the global set of search results even if the global set of search results are not tightly clustered. As another example, the system can use a smaller threshold for determining whether a particular set of search results is substantially better than the other sets of search results.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, while the above description describes searching an entity index, indexes of other types of data can be used instead of the entity index, as long as those indexes include location information. As another example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous

What is claimed is:

1. A client device comprising:
   a processor; and
   a non-transitory computer-readable memory storing instructions that, when executed by the processors, cause the client device to perform operations comprising:
   receiving a query from a user operating the client device;
   transmitting, to a search engine via a network, (i) the query and (ii) an indication of an associated geographic location;
   in a first instance, receive, in response to the query, a location-specific set of search results having a certain degree of responsiveness to the query, wherein the location-specific set of search results is specific to the associated geographic location;
   in a second instance, receive, in response to the query, a global set of search results responsive to the query, wherein the global set of search results is not specific to the associated geographic location, and wherein the global set of search results are determined to be clustered around a single location unrelated to the associated geographic location, and an aggregate distance between the global set of search results and the associated geographic location being greater than a threshold distance; and
   presenting, in each of the first instance and the second instance, a respective set of search results as a primary set of search results via a user interface.

2. The client device of claim 1, wherein the associated geographic location is determined based on information that does not include a text of the query.

3. The client device of claim 1, wherein the indication of the associated geographic location includes an Internet Protocol (IP) address of the client device.

4. The client device of claim 1, wherein the instructions further cause the client device to:
   provide a map and a map-based search user interface via which the query is received, and
   wherein the indication of the associated geographic location is a location shown on the map.

5. A method performed by a device including a processor, the method comprising:
   receiving a query and a location identifier identifying a geographic location;
   obtaining a location-specific set of search results responsive to the query and a global set of search results responsive to the query, wherein the location-specific set of search results is specific to the associated geographic location for the query and the global set of search results is not specific to the associated geographic location for the query;
   determining a degree of responsiveness for the location-specific set of search results;
   determining whether the global set of search results are geographically clustered around a single location unrelated to the associated geographic location for the query;
   selecting either the global set of search results or the location-specific set of search results as a primary set of search results based on the degree of responsiveness for the location-specific set of search result, whether the global set of search results are geographically clustered around a single location, and an aggregate distance between the global set of search results and the associated geographic location being greater than a threshold distance; and identifying one or more identified search results in the primary set of search results for presentation in response to the query.

6. The method of claim 5, wherein the associated geographic location is a geographic location determined to be of interest to a user based on information that does not include text of the query.

7. The method of claim 5, further comprising presenting the one or more identified search results.

8. The method of claim 7, further comprising:
selecting a secondary set of search results; and
presenting a selectable user interface element that, when activated by a user, causes the system to present the secondary set of search results.

9. The method of claim 7, wherein the query is received from a user through a map-based search user interface, and wherein presenting the primary set of search results comprises presenting the primary set of search results in the map-based search user interface.

10. The method of claim 5, further comprising calculating, for each of the location-specific set of search results and the global set of search results, one or more quality scores that each estimate numbers of reviews of documents associated with the search results in each results set.

11. The method of claim 5, further comprising calculating, for each of the location-specific set of search results and the global set of search results, an estimate of a physical distance between search results in one of the sets of search results and the associated geographic location for the query.

12. The method of claim 5, wherein selecting either the global set of search results or the location-specific set of search results as a primary set of search results comprises selecting the global set of search results if a predetermined percentage of entities associated with search results in the global set of search results are physically located within a predetermined distance of each other.

13. The method of claim 5, wherein selecting the global set of search results is in response to determining that the query is not for a chain of businesses.

14. The method of claim 13, including determining that the query is not for a chain of businesses is based on a percentage of top-ranked search results responsive to the query being in a same Internet domain.

15. The method of claim 5, wherein selecting the global set of search results is in response to determining that at least one of the search results in the global set of search results has a name that matches the query.

16. The method of claim 5, wherein selecting the location-specific set of search results is in response to determining that a top ranked result of the global set of search results matches a top ranked result of the location-specific set of search results.

17. The method of claim 5, wherein selecting the global set of search results is in response to determining that words in the query do not match a category associated with search results in the global set of search results.

* * * * *